United States Patent Office 3,016,410
Patented Jan. 9, 1962

3,016,410
PREPARATION OF CYCLOPENTADIENE FROM DICYCLOPENTADIENE
Clarence R. Dick and Huey Pledger, Jr., Lake Jackson, Tex., assignors to The Dow Chemical Company, Midland, Mich., a corporation of Delaware
No Drawing. Filed Dec. 28, 1959, Ser. No. 862,092
4 Claims. (Cl. 260—666)

This invention pertains to a method for the preparation of cyclopentadiene from dilute solutions of dicyclopentadiene. More particularly it pertains to the preparation of cyclopentadiene from solutions having less than 30 weight percent of dicyclopentadiene in solvents having a boiling point below the boiling point of dicyclopentadiene and above that of the monomer cyclopentadiene.

In petrochemical plants, hydrocarbon streams are often obtained which contain a relatively small amount of dicyclopentadiene in light hydrocarbons having a boiling point below that of dicyclopentadiene. Since the diene is a valuable chemical, it is desirable to recover it from these streams. It is known that dicyclopentadiene which has a boiling point of about 336° F. may be thermally decomposed to cyclopentadiene which has a boiling point of about 106° F. Numerous methods for the preparation of cyclopentadiene by thermal decomposition of dicyclopentadiene have been suggested. While these methods are satisfactory for cracking of dicyclopentadiene in concentrated solutions or in solutions where the other constituents are high boiling point materials, they are economically impractical for the recovery of dicyclopentadiene from streams which contain a small amount of the diene in a solvent or solvents having a boiling point below that of the dicyclopentadiene. Before the dicyclopentadiene can be thermally decomposed to the monomer cyclopentadiene, it is necessary by the prior art methods to remove the solvent and other light boiling constituents prior to the cracking. Thus in streams or mixtures where the concentration of the dicyclopentadiene is relatively low, the cost to distill off the large amount of solvent offsets any economic advantage gained by recovering the diene.

It is therefore an object of this invention to provide a process for the preparation of cyclopentadiene from dilute mixtures of dicyclopentadiene in a low boiling solvent. Still another object is to provide a method of recovering dicyclopentadiene from hydrocarbon streams, a major portion of which comprises low boiling materials having a boiling point below that of dicyclopentadiene.

The above and other objects are attained according to the invention by immersing in a dicyclopentadiene solution a heating surface having an area not greater than .03 square feet per cubic foot of solution, heating the dicyclopentadiene solution to a temperature in the range of 106° F. to the boiling point of the solution, and heating the heating surface to a temperature of from 750° to 1600° F. above the temperature of the solution to decompose the dicyclopentadiene and vaporize the cyclopentadiene thus formed. By using a small area heated to extremely high temperatures the dicyclopentadiene contained in dilute solutions of volatile solvents may be readily decomposed and the cyclopentadiene vaporized from the solution without first having to remove the volatile solvents. Substantially all of the dicyclopentadiene in the dilute solutions may be thus recovered as a product of substantially pure cyclopentadiene.

While the process may be carried out in a continuous manner, a batch operation is most often used. The low boiling hydrocarbons containing the cyclopentadiene are generally placed in a batch still equipped with a condenser operating at a temperature of approximately 106° F. at the top. An immersion type heater having an area in the range of .001 to .03 square feet per cubic foot of solution is immersed in the mixture in the still and heated to a temperature in the range of 750° to 1600° F. above that of the solution. When the small area is heated to this extremely high temperature the dicyclopentadiene in the solution is decomposed to the monomer cyclopentadiene which vaporizes and leaves the still. The cyclopentadiene begins to vaporize or leave the still as soon as the solution in the still exceeds the boiling point of the monomer cyclopentadiene. However, usually the temperature of the mixture in the still may gradually increase until the solution is refluxing. The solvent and other constituents boiling above the boiling point of cyclopentadiene are cooled in the condenser and returned to the still. The cyclopentadiene which has a boiling point somewhat below 110° F. leaves the condenser and is later condensed in a second condenser which is operated at a temperature sufficiently low to condense the product.

The type of immersion heater used is immaterial as long as it is possible to heat substantially all of the surface to a high temperature. A coil through which a high temperature heat medium can be passed through is satisfactory. However, an electrical heating element is preferred due to ease at which its temperature can be controlled.

While the process is especially applicable to the recovery of the monomer cyclopentadiene from a hydrocarbon solution having a boiling point in the range of 150° F. to 300° F. and containing from 5 to 15 weight percent of dicyclopentadiene, it may be used for the recovery of the diene from any organic solvent which has a boiling point above that of cyclopentadiene and below that of dicyclopentadiene and is thermally stable up to its boiling point. Light petroleum fractions, aromatic solvents, such as toluene, benzene, xylene, an naphthalene, and mixtures of aromatics and light aliphatic hydrocarbons are illustrative examples of the hydrocarbon solvents from which the dicyclopentadiene may be recovered as the monomer. The recovery may be readily obtained from solution containing as little as 0.5 weight percent of dicyclopentadiene.

The following examples further illustrate the invention.

EXAMPLE I

To illustrate the criticality of having the heated surface in the range of 750° to 1600° F. above that of solution, a series of runs was made. The heating surface in the form of an electrical heating element was maintained at various temperatures and the amount of cyclopentadiene distilling from the solution noted.

The still used was a three liter, 5 necked resin flask equipped with a reflux condenser, thermometer, a dropping funnel and connectors for the electrodes. The heating element was placed in the still so that it was immersed in the liquid when the solvent containing the dicyclopentadiene was added to the flask. This was obtained by using connectors made of glass ground joints to which was sealed a length of 8 millimeter Pyrex tubing that protruded down into the flask and below the surface of the liquid in the flask. A length of copper wire was run through the connector and the entire piece was filled with Sauereisen electrical cement. The heating element was then connected to the ends of the copper wire which were in the connectors or the 8 millimeter Pyrex tubing. A power source was connected across the other end of the connectors to provide a current flow across the heating element. The heating element used was a tungsten heating element obtained from a 1000 watt incandescent light bulb.

One liter of a dicyclopentadiene solution containing 20.7 weight percent of dicyclopentadiene, 26.2 weight percent of toluene and the remainder aliphatic hydrocarbon solvents was added to the flask. The dicyclopentadiene solution had a boiling point of about 278° F. at atmospheric pressure. After the solution was added to the flask, current was supplied to the heating element. The apparatus was operated until equilibrium conditions were attained at total reflux and then operated for an additional hour while an overhead sample was collected. During the time a sample was being taken, the water to the condenser was adjusted to cool the overhead product to about 106° F. After leaving the first condenser, the overhead vapors were condensed by passing them through a second condenser. The overhead product was weighed and analyzed to determine the rate at which cyclopentadiene was leaving the still. The amperage and voltage used were noted and the power consumption in watts was calculated. The results obtained and other pertinent data are shown in the table below.

*Table I*

| Watts | Still Temp., °F. | Heating Element Temp., °F. | Cyclopentadiene, gm./hr. |
|---|---|---|---|
| 100 | 278 | | |
| 150 | 278 | | |
| 200 | 278 | 1,020 | 8 |
| 250 | 272 | 1,290 | 81 |
| 275-80 | 257 | 1,540 | 126 |
| 300-10 | 257 | 1,620 | 152 |

The temperature of the heating element was determined by the use of an optical pyrometer.

It can be seen that when the heating element was maintained at a temperature of less than 1000° F., which is about 700° above the temperature of the liquid in the still, practically no cyclopentadiene distilled from the still, even though the solution in the still was refluxing. The rate of cyclopentadiene contained increased rapidly with increase of temperature from practically nothing at temperature differences of less than 750° F. to 152 grams per hour of cyclopentadiene when the temperature of the heating element was approximately 1400° F. above the temperature of the solution.

EXAMPLE II

A series of runs was made where the area of the heating element was varied. The apparatus described in Example I was used with the exception that the different heating elements were connected between the electrode connectors and used. The cyclopentadiene solution used was the same as that used in Example I. After the still had been operating under equilibrium conditions for one hour at total reflux, a sample of the vapor leaving the still was taken and analyzed for toluene and cyclopentadiene. The results obtained and pertinent data are given in the table below.

*Table II*

| Heating Element Area, sq. inches | Watts | Heating Element Temp., °F. | Toluene in Overhead, percent | Element Composition |
|---|---|---|---|---|
| 7.75 | 550 | 570 | 99 | Nichrome. |
| 1.55 | 350 | 890 | 5 | Si-C. |
| 0.5 | 250 | 1,500 | 1 | Tungsten. |
| 0.5 | 275 | 1,560 | 1 | Do. |

It can be seen that when a large area was used the still overhead consisted of substantially toluene. It was only after a small heating area was used at a high temperature that cyclopentadiene began to distill off.

EXAMPLE III

A one liter flask was equipped with two condensers operating in series, a dropping funnel, and a thermometer. To the flask 231 grams of a dicyclopentadiene mixture obtained from a fractionating column contained 15.1 weight percent of dicyclopentadiene, and the balance of light hydrocarbon solvents were added. The solution also contains small amounts of other adducts of cyclopentadiene and had a boiling point of 248° F. After the solution was charged to the still, 10 inches of 4 mills in diameter platinum wire was submerged and used as a heating element. The solution in the still was heated to 246° F. and a current at 27 volts was applied across the platinum wire. After 20 minutes, cyclopentadiene began to distill off and condensed in a second condenser which was operating at approximately 75° F. The first condenser on the still was operated so that at the top a temperature of approximately 106° F. was maintained. In 3 hours 39.5 grams of cyclopentadiene were collected which represented substantially quantitative yields. The distillate was analyzed by infrared and found to be substantially 100 percent cyclopentadiene. The temperature of the platinum wire was determined to be 1470° F. by an optical pyrometer.

What is claimed is:

1. A process for the preparation of cyclopentadiene from a solution containing less than 30 weight percent of dicyclopentadiene in a solvent having a boiling point below the boiling point of dicyclopentadiene and above that of cyclopentadiene, which comprises immersing in the dicyclopentadiene solution a heating surface having an area not greater than 0.3 square feet per 1 cubic foot of solution, heating the dicyclopentadiene solution to a temperature in the range of 106° F. to the boiling point of the solution, and heating the heating surface to a temperature of from 750° to 1600° F. above the temperature of the solution to decompose the dicyclopentadiene to cyclopentadiene and to vaporize the cyclopentadiene so formed.

2. A process for the preparation of cyclopentadiene from a solution having a boiling point in the range of 150° to 300° F. containing from 5 to 15 weight percent of dicyclopentadiene in a hydrocarbon solvent, which comprises immersing in the dicyclopentadiene solution a heating surface having an area of from .001 to .03 square feet per cubic foot of solution, heating the immersed heating surface to a temperature of from 1000° to 1350° F. above the temperature of the solution to decompose the dicyclopentadiene to cyclopentadiene, and refluxing the solution at its boiling point to vaporize the cyclopentadiene thus formed.

3. A process according to claim 2 wherein the heating surface is an electrical immersion heater.

4. A process according to claim 3 wherein the solvent is a mixture of toluene and light aliphatic hydrocarbons.

References Cited in the file of this patent

UNITED STATES PATENTS

| 1,418,713 | Hoxie | June 6, 1922 |
| 2,751,422 | Nelson et al. | June 19, 1956 |